March 28, 1961 F. STERZER ET AL 2,977,484
LOGIC CIRCUIT FOR A RADIO FREQUENCY CARRIER
INFORMATION HANDLING SYSTEM
Filed Sept. 10, 1958 3 Sheets-Sheet 1

INVENTORS
DONALD J. BLATTNER &
FRED STERZER
BY
Milton S. Winters
ATTORNEY

INVENTORS
DONALD J. BLATTNER &
FRED STERZER
BY
Milton S. Winters
ATTORNEY

INVENTORS
DONALD J. BLATTNER &
FRED STERZER
BY
Milton S. Winters
ATTORNEY 2,977,484

LOGIC CIRCUIT FOR A RADIO FREQUENCY CARRIER INFORMATION HANDLING SYSTEM

Fred Sterzer, Monmouth Junction, and Donald J. Blattner, Princeton, N.J., assignors to Radio Corporation of America, a corporation of Delaware Filed Sept. 10, 1958, Ser. No. 760,225

7 Claims. (Cl. 307—88.5)

The present invention relates to information handling systems, such as electronic computers, and particularly to components of such systems of the type sometimes called "logic" circuits.

It is desirable in information handling systems and computers that the systems operate at a high speed. Accordingly, it is desirable that the various logic circuits be of high speed, both in response and in recovery time. High speed operation involves the transmission and amplification of very short pulses. Such transmission and amplification, in turn, require circuits which pass very large bandwidths. For example, if a computer is to be operated at a pulse rate of 1,000 megacycles per second, then each pulse may be allotted a time interval of about $10^{-9}$ seconds or less. To amplify such pulses, components are required having a bandwidth of at least 2000 megacycles, so that pulses having a rise time of one-half of a millimicrosecond may be reproduced. Techniques for the amplification of such short pulses, if these are D.-C. (direct-current) pulses, are not presently available. However, microwave components are available, both for the transmission and amplification of pulses, which have comparable bandwidths. The use of RF (radio frequency) pulses also provides a degree of freedom or manipulation in the use of the phase of the RF.

Therefore, it has been suggested that electronic information handling systems use pulses of RF which occur or are absent in certain time spaces. In such a system, a binary "one" may be encoded as a pulse of RF energy in a time space, and a binary "zero" may be encoded as the absence of a pulse in the time space. The RF pulses may be carried by suitable transmission lines, such as hollow pipe waveguide or two conductor transmission lines, such as coaxial lines or strip line. In practicing the present invention, it is contemplated that the RF carrier of different pulses be phased definitely with respect to that of other RF pulses in the same time space.

It is an object of the present invention to provide high speed logic circuits for a radio frequency carrier system of the type described.

It is another object of the system to provide a high frequency adder circuit for a radio frequency carrier information handling system.

It is another object of the invention to provide, for a radio frequency carrier information handling system of the type mentioned, a "half-adder" circuit.

Another object of the invention is to provide, for a radio frequency carrier system of the type mentioned, a fast acting adder circuit.

The foregoing and other objects, advantages, and novel features of the invention will be more fully apparent from the following description when read in connection with the accompanying drawings, in which like reference numerals refer to like parts and in which.

Figure 1:
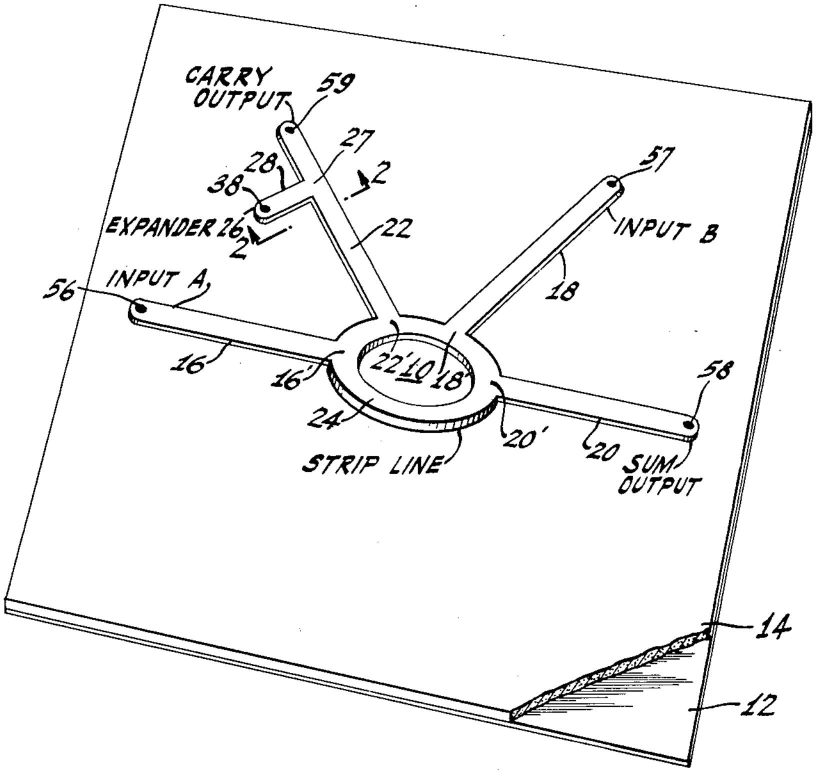
Figure 1 is a schematic perspective view of a half-adder embodying the invention and using a hybrid circuit.

With reference to Figure 1, a hybrid circuit 10, in rat race form, is preferably constructed of strip transmission line. Such strip line may be constructed by employing a metal ground plate 12, which may be of copper, applied as a backing on one surface of a suitable dielectric 14. On the other surface of the dielectric 14 are strips of copper, which may be applied by printed circuit techniques, to form the desired transmission line circuit. The transmission line is formed between the strip copper and the spaced ground plate 12. The term hybrid circuit is applied herein as a general term to a known class of circuits, such as the rat race 10 and its equivalents. The hybrid circuit 10 of Fig. 1 includes a first input arm 16 to which is applied input A, a second input arm 18 to which is applied input B, and a third, output arm 20 from which, as indicated, the sum output is taken. A fourth, output arm 22 has an output end from which the carry output is taken. The other end of the carry output arm 22 is connected at a junction 22′ to a circular strip line 24 of electrical circumference $3\lambda/2$, where $\lambda$ is a wavelength at the operating frequency in the strip line. The input A line 16, input B line 18, and sum output line 20 are also connected to the circular strip 24 at junctions 16′, 18′, and 20′, respectively. The input A line junction 16′ and the sum output line junction 20′ are $3\lambda/4$ apart following one path around the circular strip line diametrically. Along the other path around circular strip line 24, the carry output line junction 22′ is a distance $\lambda/4$ from the input A line junction 16′; the input line junction 18′ is a distance $\lambda/4$ from the carry output line junction 22′; and, consequently, also a distance $\lambda/4$ from the sum output line junction 20′.

At the end of each of the arms 16, 18, 20, 22 there are shown heavy dots each representing, respectively, terminating transducers 56, 57, 58 and 59 connected to respective coaxial lines. Alternatively, the arms may be extended to other units. It is sufficient to describe one such transducer, say 55, which consists of a coaxial line having an outer conductor connected to the ground plate 12 at the boundary of a circular aperture in the ground plate, and the inner conductor extended through the aperture and dielectric 14 to make a connection with the stripline. The dot is a pictorial representation of such a soldered connection. A similar transducer 30 is described more fully and illustrated in connection with an expander element 26.

Figure 2:
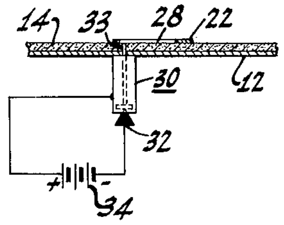
Figure 2 is a cross-sectional view of a detail of Fig. 1.

The carry output line 22 includes an expander element 26, which is described more fully in the copending application of Fred Sterzer, entitled "Computer Components," Serial Number 745,220, filed June 27, 1958. The expander 26, shown in more detail in Fig. 2, includes a strip line somewhat less than a quarter wavelength at the operating radio frequency (RF). The near quarter wavelength strip line 28 is connected effectively in shunt to the carry output line 22 at a junction 27, and is terminated at the end remote from the junction 27 by a known type of transducer 30 which transfers the RF energy between a piece of coaxial line and the near quarter wavelength strip line 28. The transducer 30 preferably includes an outer conductor connected to the ground plate 12 and an inner conductor which passes through an aperture in the ground plate to make connection to the strip. Suitable impedance matching may be provided. The coaxial line transducer 30 may have a crystal mounting at its termination for a crystal, such as the crystal 32. The line section 28 together with the transducer 30 and its termination act as a quarter wavelength line. The diode 32 is located at the end of the transducer 30 remote from the strip line 28. The diode 30 is back-biased by a suitable direct current (D.C.) source represented by the battery 34.

The operation of the expander 26 may be understood by considering the portion of the carry output strip line 22 adjacent the circular strip line 24 as the input end of the strip line section 22, and the end remote therefrom as the output end. Assume that a low amount of power input is applied to the input end of the strip line section 22. It is assumed that the amplitude of the RF voltage applied to the diode 32 resulting from the application of this low input power is insufficient to drive the diode 32 into conduction against the bias. Therefore, the line section 28 (with its coaxial line transducer 30) is a quarter wavelength line section open circuited in its remote end. Note that a coaxial line quarter wave stub connected appropriately at the junction 27 would act in similar manner, but may not be as broad banded. The line section 28 now appears as a short circuit at the junction 27 thereof with the strip line 22. Consequently, the RF energy from the input end of the line section 22 is reflected by this apparent short circuit at the junction 27. Thus, there is substantially no power output, or very little output, at the carry output. When the RF power input reaches a value, for example, P*i*, the RF power output may still have a small value P1. However, as the power input increases to larger value, for example, 4P*i*, the diode 26 conducts heavily and the line section 28 termination appears more nearly matched than before. In an ideal case, the power may divide in the junction 27 between the line section 28 and the carry output. Accordingly, there is a substantial amount of carry power output P2 as a result of the power input 4P*i* at the junction 22′. The power output P1 corresponding to the input P*i* is, under these circumstances, small compared to the output P2 corresponding to the power input 4P*i*. For a more detailed description of the operation of the expander, reference may be made to the above-mentioned copending application. If the location of the expander junction 27 is judiciously selected with respect to the junction 22′ of the arm 22 with the circular strip line 24, so that the electrical distance between junction 22′ and junction 27 of the strip line 22 is substantially $\lambda/4$, the operation of the half-adder may be somewhat improved, as will appear more fully hereinafter.

In the operation of the half-adder of Fig. 1, assume the information to be coded as pulses of RF energy, the presence of a pulse in a pulse space (of time) indicating a binary "one" and the absence of an RF pulse in a pulse space indicating a binary "zero." Suppose during a specified pulse space that an input pulse is applied to the input A arm 16. Because of the known properties of the hybrid circuit 10, the energy from the input arm 16 will divide, one-half leaving at the sum output arm 20 and the other half leaving at the carry output arm 22. If the power of the input A pulse is P*i*, then the input to the carry output arm 22 is only of energy P*i*/2. This energy is reflected from the junction 27, and does not pass to the carry output. The reflected energy may be of such phase, because of the selected distance (say $\lambda/4$) between the expander junction 27 and the carry output junction 22′ that the output at the sum output arm 20 is enhanced. Accordingly, the sum output energy is P*i* and the carry output is substantially zero. If power of amplitude P*i* is applied to the input B arm 18, a similar action causes a similar power output of P*i*/2 at the sum output 20 arm, and no output at the carry output. Now, suppose similar inputs are applied similar in both the input A arm 16 and the input B arm 18. The RF energy is phased to arrive at the junctions of these arms with the circular strip 24 in proper phase. Because of the known properties of hybrid circuit 10 there is substantially no output at the sum output arm 20. However, the energy entering the carry output arm 22 is now about four times that which was applied to carry arm 22 when RF energy was supplied from only one of the input arms 16 or 18. Therefore, a substantial output appears at the carry output of the carry output arm 22. Thus, the two inputs and the two outputs of the half-adder are logically related in the fashion required to give half addition. It will be understood that, with sufficient discrimination, the power of the output at the sum and carry outputs may be standardized by virtue of the expander action or by using suitable limiters or power amplifiers, as required.

Figure 3:
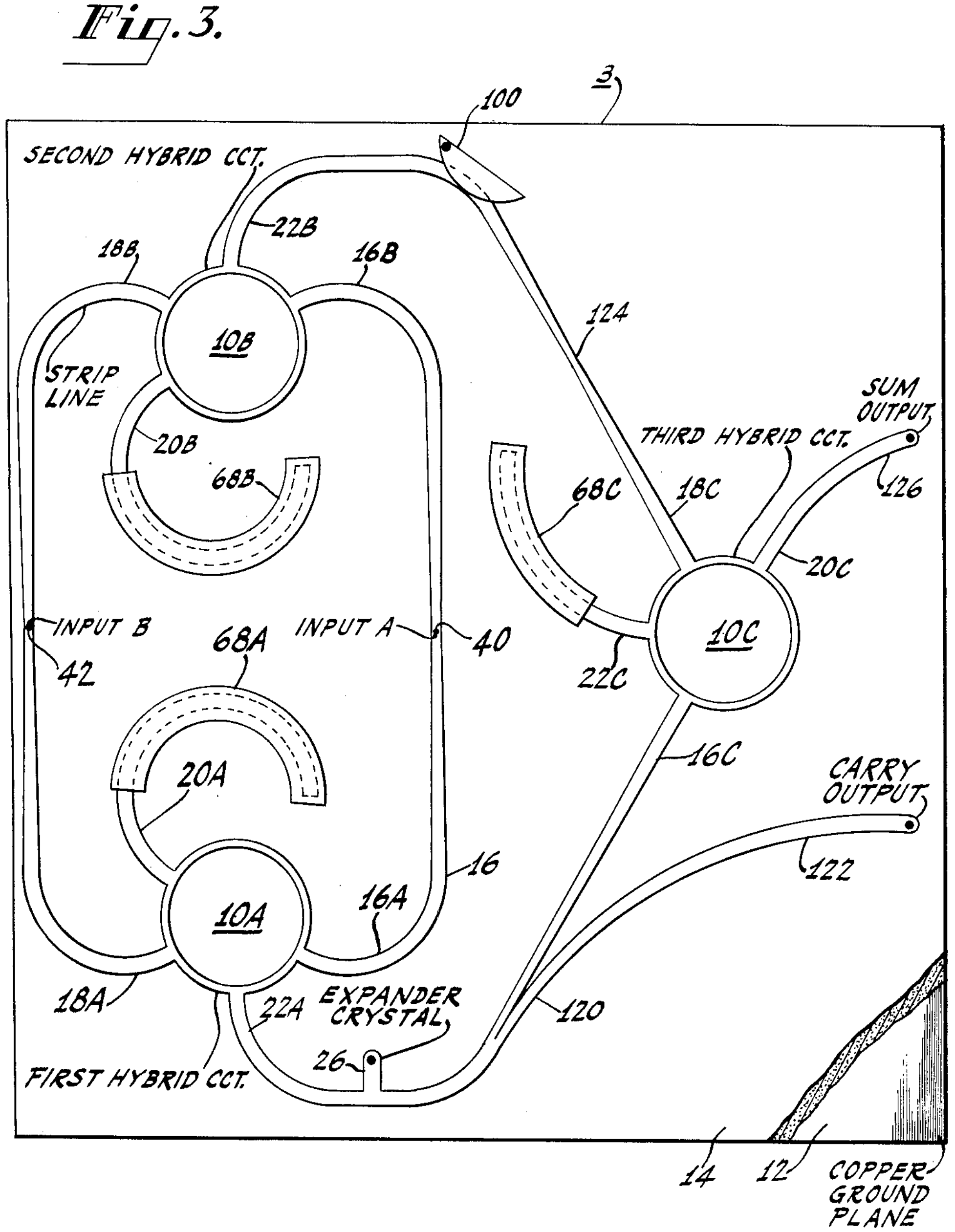
Figure 3 is a plan view of a half-adder circuit embodying the invention whach has a constantly phased output and uses three hybrid circuits.

In the arrangement of Fig. 1, the phase of the energy at the sum output 58 depends on which input, A or B, is active in applying pulsed energy. The strip line arrangement of Figure 3 illustrates a phase determined half-adder. The phase of the output is insensitive to which of the two inputs, A or B, is active. A first pair of hybrid circuits 10 of a rat race form, each similar to the hybrid circuit 10 of Figure 1, are employed. There are applied to the parts of the first of the paired circuits respectively corresponding to those of Fig. 1 corresponding reference characters distinguished by adding the character "A," and to those of the second of these paired circuits, corresponding reference characters distinguished by adding the character "B." The first input arms 16A and 16B are connected together and the second input arms 18A and 18B connected together in a symmetrical fashion. The length of the connection between the arms 16 and the length of the connection between the arms 18 are equal.

At a point midway between arms 16A and 16B, where these arms join, an A input 40 is provided as by means of a coaxial line transducer indicated schematically by the heavy dot. The A input 40 transducer may be similar to those described in connection with Fig. 1. The B input 42 includes a similar transducer similarly indicated and is located midway between arms 18A and 18B similarly to the location of the A input 40. The arms 16A, 16B and 18A, 18B are each tapered, as shown, to about half their full width at the A and B inputs, for impedance matching purposes. Each of the first output arms 20A and 20B of these paired hybrid circuits 10A and 10B are terminated with substantially matched or reflectionless terminations 68A and 68B, respectively. The termination 68A or 68B may be made of a card (or thin sheet) of insulating material covered with graphite. The graphite affords a resistive, energy absorptive material. This material is interposed in the RF field between the copper strip and the ground plate 12 by laying the card on top of the strip. The graphite then absorbs an amount of RF energy. When the card is moved to place more of the card over the strip, more energy is absorbed. Each of output arms 20A and 20B may be curved to allow a longer piece of attenuating material in a reasonable space. The first output arms 20A and 20B may be enclosed between the closed loop formed by the paired hybrid circuits 10A and 10B and the joined arms 16A and 16B and 18A and 18B, whereas the second output arms 22A and 22B are free, topologically, to make connection respectively with first and second input arms 16C and 18C of a third hybrid circuit 10C, which, again, is similar to the circuits 10 of Figure 1, the addition of the letter C being added to the reference characters for thus distinguishing them. The first of the paired hybrid circuits has its second output arm 22A extended past an expander 26 to a junction 120 from which the carry output is taken, the other output of the junction extending smoothly into the first input arm 16C of the third hybrid circuit 10C. The arms or branches from the junction 120 are tapered for matching, thus to prevent reflection, the carry output arm 122 curving smoothly away from the junction. The second output arm 22B of the second hybrid circuit extends smoothly into the second input arm 18C of the third hybrid circuit and includes a narrowed or smoothly necked down portion 124, the purpose of which will appear hereinafter. The first output arm 20C of the third hybrid circuit leads to the sum output 126. The second output arm 22C of the third circuit is terminated with a matched absorbent termination 68C which may be similar to the other absorbent terminations heretofore mentioned. The extension of this second output arm 22C is also curved for reasons similar to those for curving arms 20A and 20B. Between the second output arm 22B of the second hybrid circuit 10 and the narrow or necked down portion 124 is an adjustable attenuator 100, which, although shaped as a semicircle, is in other respects similar to the attenuators 68A or B. By adjusting the position of attenuator 100, the power applied from this output arm 22B of the second hybrid circuit to the second input arm 18C of the third hybrid circuit 10C may be suitably adjusted. For adjustment, the attenuator 100 may be rotated about a pin at one corner thereof.

In operation, assume that an RF pulse is applied during a pulse space to the A input 40 through its transducer. The RF power from the A input pulse divides, one-half being conveyed to each of the first input arms 16A and B of the paired hybrid circuits 10A and 10B. At each of the paired hybrid circuits 10A and B, respectively, the incoming power divides equally between output arms 20A and 22A and the arms 20B and 22B. The power leaving the paired hybrid circuits 10A and B at the first output arms 20A and B, respectively, is absorbed by the matched terminations 68A and B. Accordingly, of the total input power initially applied at the A input 40, one-half of this power is absorbed in terminations 68A and B and the remainder is divided equally between the second outputs 22A and 22B of the paired hybrid circuits 10A and B. After some attenuation by the attenuator 100, in an amount to be described hereinafter, the power from the second hybrid circuit second output 22B is applied through the necked down portion 124 to the second input 18C of the third hybrid circuit 10C.

The power from the other, second output line 22A of the first of the paired hybrid circuits is substantially blocked by the expander 26A, and substantially all of this power is reflected. Accordingly, there is practically no power output at the carry output 122 and substantially no power is applied to the first input 16C of the third hybrid circuit 10C. The power reflected by the expander 26A returns to the first paired hybrid circuit 10A and is reflected into the input lines 16A and 18A, from whence a portion is passed into the input lines 40 and 42 respectively and to the second hybrid circuit input lines 16B and 18B. The latter divides again at the hybrid circuit 10B, some of the energy being lost in the matched termination 68, and the remainder of the power may be neglected or may join the energy which travels toward the adjustable attenuator 100, that is, the output power along the line 22B of the first hybrid circuit 10B, assuming appropriate phasing.

This power incident at the input 18C to the third hybrid circuit 10C divides, half leaving via each of output arms 20C and 22C. The RF energy from arm 22C is absorbed by the termination 68C. The RF energy from the output arm 20C provides an output pulse at the half adder sum output 126.

Accordingly, it is apparent that there is an RF output pulse at the sum output 126 when an A input pulse is applied at the A input 40, and there is no pulse applied at the B input 42. Further, it is apparent that there is an RF output pulse at the sum output 126 when a pulse is applied at the B input 42, and no pulse is applied at the A input 40, the operation being similar to that for the case when only an A input is applied. If RF pulses are applied in like phase at both the A and B inputs 40 and 42, the energy from each pulse initially divides as before, about half of the A pulse arriving at each of the paired hybrid circuits 10A and 10B, respectively, via arms 16A and 16B; and about half of the B pulse energy arriving at each of the paired hybrid circuits 10A and 10B, respectively, via arms 18A and 18B. At hybrid circuit 10A, half the energy arrives in like phase at the input arms 16A and 18A, causing substantially the total energy received from these two arms to exit at arm 22A and substantially none at arm 20A, because of the properties of the hybrid circuit. This energy leaving at arm 22A and incident at the expander 26 is about four times the amount incident there when only a single pulse is applied at the A or B input only, provided the input pulses are all about the same amplitude. Note that the voltage incident at expander 26 is doubled for the coincident A and B pulses, and the power, or energy content, is quadrupled. Therefore, the pulse energy incident at expander 26 is passed substantially undiminished toward the junction 120. At the junction 120, the energy from the arm 22A divides, about half passing to the carry output branch 122 and the other half into the other branch toward arm 16C of the third hybrid circuit 10C. In a similar manner, the energy incident from arms 16B and 18B at hybrid circuit 10B combines and passes out of arm 22B. The energy from arm 22B is about equal to the energy from arm 22A. The attenuator 100 is adjusted so that the energy incident on hybrid circuit 10C from arm 18C is equal to that from arm 16C. Further, the necked down portion 124 is narrowed so that the energy incident from arm 18C is in like phase with that from arm 16C. Other known means of phase compensation may be employed. Under these conditions, because of the properties of the hybrid circuit, the energy from the arms 16C and 18C combines at arm 22C and is absorbed in termination 68C. Substantially no energy leaves at the arm 20C. Hence, there is no pulse output at the sum output 126 under these conditions.

Figure 4:
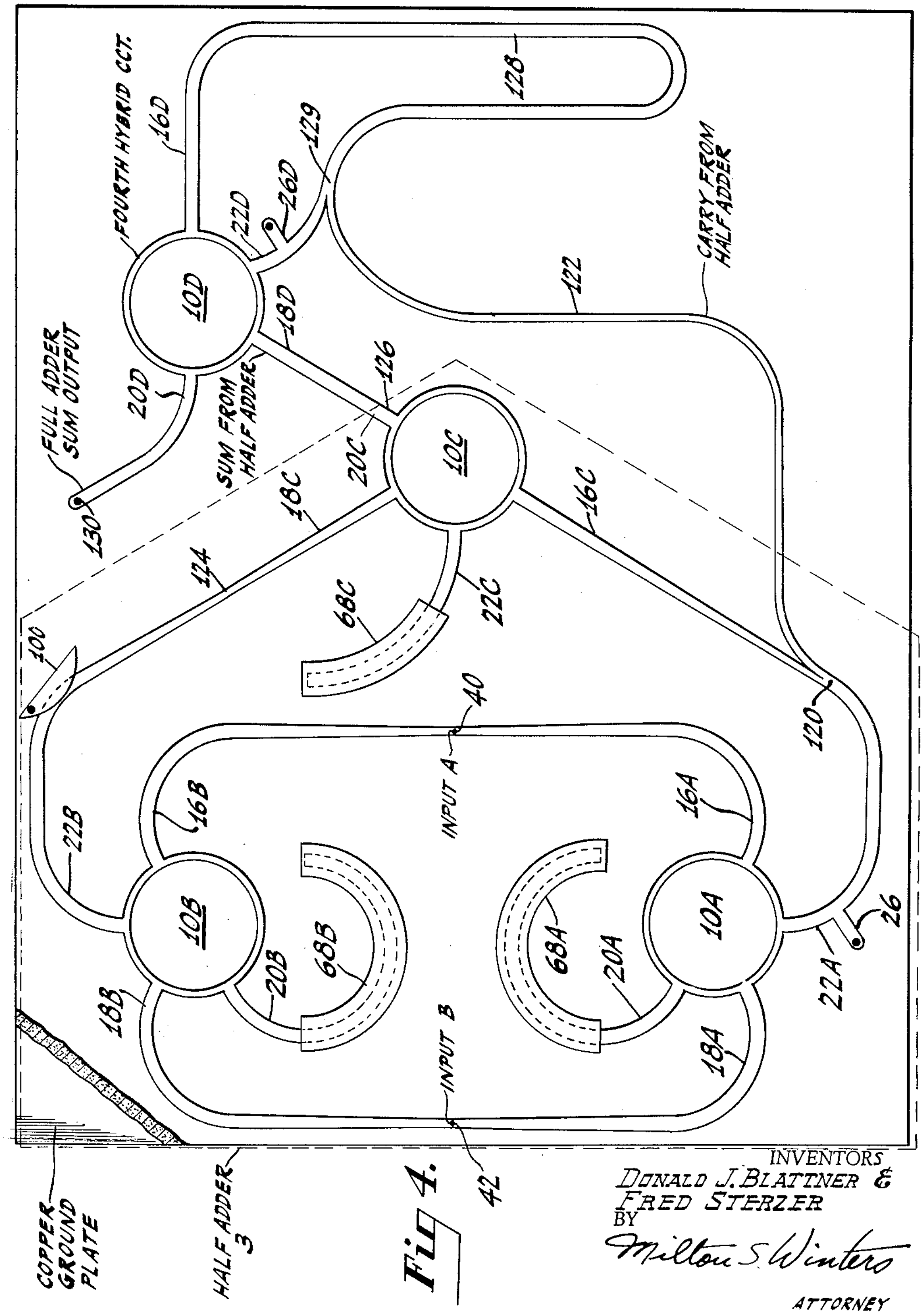
Figure 4 is a plan view of a full-adder circuit which employs a half-adder circuit like that of Fig. 3.

In the full adder of Fig. 4, the half adder 3 of Fig. 3 is indicated by being enclosed in the dotted lines. The fourth hybrid circuit 10D is like the circuit 10, the parts being distinguished by adding the reference character D to the corresponding reference characters of Fig. 1. The circuit 10D receives at its arm 18D the sum output from the half adder sum output 126. The arm 16D of the fourth hybrid circuit receives a carry input, in a manner more fully described hereinafter. This fourth circuit arm 16D is connected in a loop 128 to the fourth circuit output arm 22D which has connected thereto an expander 26 at a junction 129. The half adder carry output arm 122 is extended and coupled directionally to the loop 128 at a point between the fourth circuit expander 26D, some distance from the fourth circuit input 16D, in a way to couple the carry signal, if any, from carry output arm 122 toward the fourth input arm 16D, and none or little toward the fourth circuit expander 26D.

In operation, obviously, if there are no inputs, then there are not outputs. Assume an A input pulse at 40 or a B input pulse at 42, in the absence of a previous carry. As mentioned hereinbefore, a sum output appears at the third hybrid circuit sum output 126, and none at the carry output 122. Such an input, applied at the third hybrid circuit, second input arm 18D, by reason of the characteristics of the hybrid circuit, causes energy to flow out of the third circuit arm 20D. Such energy as flows out of the third circuit arm 22D is largely blocked by the expander 26D.

Assume an A input pulse and a B input pulse to arrive simultaneously at terminals 40 and 42 respectively. No sum output appears at the half adder sum output arm 126, and an output appears at the half adder carry output 122. With respect to this carry output pulse, it passes now to the directional junction 129, thence around the loop 128 to the fourth circuit input arm 16D. The pulse arrives at the fourth hybrid circuit 10D, because of the delay in passage along the half adder carry output 122 and the loop 128, at a time later by one pulse repetition period than a sum pulse applied from the half adder sum output 126 in the same pulse period would have arrived via the fourth circuit input arm 18D at the fourth hybrid circuit 10D.

Consider the case in which there is neither an A input nor a B input, but a previous carry, such as the pulse just described, which arrives at the fourth hybrid circuit via the arm 16D. In this case, the energy divides, about half passing to the sum output 130 via the fourth circuit arm 20D. The other half, which passes toward the expander 26D along the fourth circuit arm 22D, is blocked by the action of the expander 26D, as heretofore explained. Accordingly, an output occurs, in this case only at the total sum output 130.

Consider, however, those cases in which a previous carry pulse from the next preceding pulse period is incident at the fourth hybrid circuit 10D from the arm 16D, and a pulse applied at either the A or the B input 40 or 42 (not both) causes a pulse to appear at the half adder sum output 126 which is incident at the fourth hybrid circuit 10D from the arm 18D; the two pulses, the previous carry pulse from arm 16D and the new sum pulse from arm 18D arriving simultaneously at the fourth hybrid circuit 10D in like phase. By reason of the properties of the hybrid circuit, there is no output at the sum output 130, since the energy from arms 16D and 18D arrive at arm 20D out of phase with each other. At arm 22D, however, the RF pulses arrive in like RF phase, and the amplitude thereof is sufficient to pass the expander 26D, thereby providing a new carry pulse for the next succeeding pulse period. This new carry pulse arrives just in time at the fourth hybrid circuit 10D and in proper, like phase, by reason of the delay imposed by the loop 128, to join with a next succeeding pulse, if one is presented at the fourth hybrid circuit 10D from the arm 18D. If no such next pulse is present, then the carry pulse entering from the arm 16D causes an output at the total sum output 130, as explained before.

The only remaining case is that in which the A and B pulses at inputs 40 and 42 are both present and a previous carry pulse from the preceding pulse period circulates in the loop 128. In this last case, there is no sum pulse at the output 126 of the half-adder, and there is a carry pulse from the half adder at the output 122. The previous carry pulse arrives via the arm 16D at the fourth hybrid circuit 10D and provides an output at the full adder sum output 130. This previous carry pulse does not contribute sufficient output at arm 22D to pass the expander 26. At the same time, the new carry pulse from the half adder carry output 122 now is applied by the directional coupler junction 129 to the loop 128, thus providing a carry pulse for the next succeeding output.

Therefore, the pulses at the A and B inputs 40 and 42, the output pulses at the full adder sum output 130, and the output pulses arriving at the arm 16D from the loop 128 are related as in the following "truth" table:

*Table*

| A Pulse | B Pulse | Previous Carry (at arm 16D) | Full Adder Sum (Output at 130) | New Carry (at carry arm 122) |
|---|---|---|---|---|
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |

A one (1) in the table under a heading indicating the presence of the pulse at the point indicated by the heading, a zero under any heading the absence of a pulse, and the relationship in any case being expressed by the pertinent selected row.

The arrangement of Fig. 4, by way of illustration, is drawn substantially to scale, as a top view, the original patent drawing being about two-thirds of full size. This arrangement was designed to operate at a carrier frequency of 3000 megacycles per second, and at a pulse repetition frequency of 500 megacycles per second.

In describing the operation of the various figures, except for the delay loop 128 it has been assumed for convenience of description that the energy travels virtually instantaneously along its various paths of travel, so that when referring to a "pulse space," the timing thereof is definite. In fact, however, allowance or compensation is made for the finite travel time introduced by the various strip lines and hybrid circuits, so that any of the pulses to be combined or cancelled will arrive at a particular place at the proper relative time, not only with respect to phase, but also with respect to other pulses which are supposed to occupy a like pulse space. Thus, in Fig. 4, for example, the pulses originating from the A or B inputs 40 or 42, at a given pulse space, arrive at the third hybrid circuit 10C as the same time by way of equal path lengths or delays. Notice, for example, that the length of the half-adder carry output strip line 122 is extended to compensate for the delay in the strip line circuitry associated with the hybrid circuit 10C. Thus, the time of travel of energy from the half-adder carry output junction 120 along this strip line 122 to the directional coupling junction 129 is equal to the time for RF energy to travel from the half-adder carry junction 120 through the fourth hybrid circuit 10D, out arm 22D to the junction 129. Note, also, however, that the length of the loop 128 from arm 22D to arm 16D need introduce a delay equal only to the time between the beginnings of two successive pulse spaces as measured, of course, at some fixed point such as the A input 40.

It will be apparent from the foregoing description that we have provided a novel arrangement for half-adder and adder circuits of a type useful in pulsed RF carrier computer systems.

What is claimed is:

1. A logic circuit for an information handling system in which the information is coded in electrical energy at an operating carrier frequency comprising a hybrid circuit having two input arms and two output arms, a first of said input arms being arranged for receiving information coded in such energy, the second of said input arms being arranged for receiving other information at the same frequency coded in such energy, one of said output arms being coupled to a transmission line, a section of transmission line connected effectively in shunt with said first-mentioned transmission line and having an effective quarter-wavelength at the said operating frequency, diode connected at the termination of said transmission line section, and means for biasing said diode to a value such that the concurrent application of energy at said carrier frequency to said two input arms is required to cause the diode to conduct.

2. An arrangement comprising a pair of hybrid circuits each having first and second input arms and first and second output arms, said first input arms being connected to a first common source and the second input arms being connected to a second common source, a third hybrid circuit having two input arms connected respectively to said first output arms, a transmission line section connected effectively in shunt with one of said first output arms, a diode connected to said line section, and means for providing a direct current bias voltage for biasing said diode.

3. A logic circuit for an information handling system in which the information is coded in electrical energy at an operating carrier radio frequency comprising a pair of hybrid circuits each having first and second input arms and first and second output arms, said first input arms being connected in common for connection to a first common source of such coded energy and the second input arms being connected in common for connection to a second common source of such coded energy, the electrical path length for said energy from the common connection of said first arms to said hybrid circuits being equal to each other and to the electrical path length for said energy from the common connection of said second arms to said hybrid circuit, a third hybrid circuit having two input arms connected respectively to said first output arms, the electrical path length for said energy from said pair of hybrid circuits along the respective first output arms and the third hybrid circuit input arms to said third hybrid circuit being equal to each other, a transmission line section having an effective length of a quarter wavelength at the said opening frequency and connected effectively in shunt with one of said first output arms, a diode connected to said line section, and means for applying a direct current bias voltage to said diode for biasing said diode.

4. A logic circuit for an information handling system in which the information is coded in electrical energy at an operating carrier radio frequency comprising a pair of hybrid circuits each having first and second input arms and first and second output arms, said first input arms being connected in common for connection to a first common source of such coded energy and the second input arms being connected in common for connection to a second common source of such coded energy, a third circuit having two input arms connected respectively to said first output arms, a component comprising a transmission line section having an effective length of a quarter wavelength at the said operating frequency and connected effectively in shunt with the said first output arm of one of said pair of hybrid circuits, a diode connected to said line section, and means for applying a direct current bias voltage to said diode for biasing said diode, a fourth hybrid circuit having two input arms and two output arms, a delay path connected between a first of said fourth hybrid circuit output arms and a first of said fourth hybrid circuit input arms, a junction in said one hybrid circuit first output arm more distant from said one hybrid circuit than the shunt connection of said component line section, said junction providing a further output connected to said delay path, a second component comprising a second transmission line section having an effective length of a quarter wavelength at the said operating frequency and connected effectively in shunt with the said fourth hybrid circuit first output arm between said fourth hybrid circuit and the connection of said further output and said delay path, a second diode connected to said second line section, and means for applying a direct current bias voltage to said second diode for biasing said second diode, and a connection between a first output arm of said third hybrid circuit and the second input arm of said fourth hybrid circuit.

5. In an information handling system in which radio-frequency pulses indicate binary digits, a hybrid circuit including four transmission lines of the type in which radio-frequency energy applied to the first line divides substantially equally between the second and fourth lines, radio-frequency energy applied to the third line divides substantially equally between the second and fourth lines, and in phase radio-frequency energy applied simultaneously to the first and third lines arrives out of phase at, and does not pass into, the fourth line and arrives in phase at and passes into the second line; and means coupled to the second line and responsive to in phase concurrent radio-frequency pulses applied to the first and third lines for permitting said in phase pulses to pass down the second line, and responsive to a radio-frequency pulse applied only to the first or only to the third line for reflecting the portion of that pulse reaching the second line back to the fourth line in phase with the portion of the pulse reaching the fourth line from the first or third lines, respectively.

6. In a system as set forth in claim 5, said last-named means comprising a reverse biased diode connected to said second line.

7. In a system as set forth in claim 5, said hybrid circuit comprising a ring-type, strip-line hybrid circuit.

References Cited in the file of this patent

UNITED STATES PATENTS

| | | |
|---|---|---|
| 2,438,367 | Keister | Mar. 23, 1948 |
| 2,818,549 | Adcock et al. | Dec. 31, 1957 |
| 2,850,826 | Tomiyasu | Sept. 2, 1958 |
| 2,874,276 | Dukes et al. | Feb. 17, 1959 |
| 2,914,671 | De Lange | Nov. 24, 1959 |